United States Patent [19]

Dickens et al.

[11] Patent Number: 5,115,016

[45] Date of Patent: May 19, 1992

[54] REINFORCED POLYESTER MOLDING COMPOSITIONS HAVING HIGH GLOSS AND IMPROVED RESISTANCE TO WARPING

[75] Inventors: Virgel Dickens; Michael G. Minnick, both of Mount Vernon, Ind.

[73] Assignee: General Electric Company, Pittsfield, Mass.

[21] Appl. No.: 631,182

[22] Filed: Dec. 19, 1990

Related U.S. Application Data

[63] Continuation of Ser. No. 947,663, Dec. 30, 1986, abandoned.

[51] Int. Cl.$^5$ .............................................. C08L 67/02
[52] U.S. Cl. .................................. 524/513; 525/176; 525/425; 525/444; 524/449; 524/451; 524/538; 524/539
[58] Field of Search ........................ 524/513; 525/176

[56] References Cited

U.S. PATENT DOCUMENTS

| | | | |
|---|---|---|---|
| 3,562,200 | 2/1971 | Jones | 524/444 |
| 3,953,394 | 4/1976 | Fox | 524/513 |
| 4,013,613 | 3/1977 | Abolins | 525/444 |
| 4,115,333 | 9/1978 | Phipps, Jr. et al. | 260/22 |
| 4,125,571 | 11/1978 | Scott et al. | 260/860 |
| 4,140,670 | 2/1979 | Chartes | 524/513 |
| 4,212,791 | 7/1980 | Avery | 525/69 |
| 4,215,032 | 7/1980 | Kobayashi et al. | 260/40 |
| 4,393,153 | 7/1983 | Hepp | 524/513 |
| 4,425,457 | 1/1984 | Christiansen et al. | 524/293 |

Primary Examiner—Patricia Short
Attorney, Agent, or Firm—Hedman, Gibson & Costigan

[57] ABSTRACT

Improved polyester compositions exhibiting improved gloss and resistance to warping comprise crystallizable polyester resins, e.g., poly(ethylene terephthalate) optionally with poly(1,4-butylene terephthalate) and a reinforcing agent, the improvement comprising adding a modifier selected from an amorphous or semi-crystalline thermoplastic for gloss and warp resistance improvement. The molding compositions exhibit excellent resistance to warp even after adding significant amounts of reinforcing glass filaments.

2 Claims, No Drawings

REINFORCED POLYESTER MOLDING COMPOSITIONS HAVING HIGH GLOSS AND IMPROVED RESISTANCE TO WARPING

This is a continuation of application Ser. No. 06/947,663, filed Dec. 30, 1986, now abandoned.

This invention relates to reinforced thermoplastic polyester compositions which have improved processability and physical properties as molded articles. More particularly, it pertains to compositions comprising crystallizable polyester resins comprising poly(ethylene terephthalate) PET, optionally poly(1,4-butylene terephthalate) PBT and reinforcing material using an amorphous or semi-crystalline thermoplastic for the improving modifier. After molding, the compositions exhibit excellent resistance to warp even when significant amounts of reinforcing glass filaments are present.

BACKGROUND OF THE INVENTION

Reinforced thermoplastic compositions of highly crystalline polyester resins have been described, inter alia, in U.S. Pat. Nos. 4,115,333; 4,125,571; 4,215,032 and 4,425,457. They exhibit considerable tendency to warp, and efforts to reduce warp by adding modifiers, tend to reduce surface appearance, as measured by gloss.

In U.S. Pat. No. 4,115,333, Phipps et al. disclose such reinforced compositions comprising a poly(1,4-butylene terephthalate) resin and a second resin of polycarbonate, glass fibers and a small amount of zinc stearate to improve warp resistance. Although the compositions in the '333 patent are eminently suitable for many uses as molded articles, good warp values as measured by a 4 inch×1/16 inch thick disk after 30 minutes at 350° F. are only obtained when a second resin, polycarbonate is used. See, e.g., Example 2A. Gloss is not too good, either.

Scott et al., U.S. Pat. No. 4,125,571, describe thermoplastic molding compositions consisting essentially of a combination of polyesters, e.g., PBT and poly(1,4-cyclohexane -dimethanolterephthalate-co-isophthalate), and reinforcing filler of glass and mica. Good warp values are also obtained by Scott et al.'s molding compositions but these were subject to much greater variability with higher contents of glass and lower contents of PBT, i.e., replacement by poly(1,4-cyclohexanedimethanol terephthalate-co-isophthalate). Gloss was not as high as desirable, either.

In U.S. Pat. No. 4,215,032, Kobayashi et al. describe polyester compositions for molding materials composed of solid PET, an organic crystallization promoter, e.g., glycidyl ether of a polyalkylene glycol, and glass fibers. The PET compositions in this patent are not, however, particularly resistant to warpage under heat stress.

In U.S. Pat. No. 4,425,457, Christiansen et al. disclose PET resin compositions containing reinforcing filler of glass fibers and nucleating agents of monovalent metal salts. These compositions are not shown to have superior physical properties such as impact strength or resistance to warpage. Gloss was not optimum here either.

It would be useful to incorporate into these thermoplastic polyester materials a thermoplastic elastomer to impart high surface gloss and better resistance to warp. It would be helpful also to improve impact resistance, moldability, colorability, compatibility and the like. Resistance to warp is particularly critical when using high glass contents in thermoplastic compositions which, as the prior art has shown, tend to decrease such resistance.

Unexpectedly, it has now been discovered that such objects can be achieved by using an amorphous or semi-crystalline thermoplastic. These can be incorporated into reinforced PET or PET/PBT molding compositions so as to improve surface gloss and resistance to warp on exposure to heat, while at the same time imparting toughness and strength. Articles molded from such compositions are useful in many applications including under-hood automotive applications, electrical connectors, appliance bases and power tool housings.

SUMMARY OF THE INVENTION

Provided in accordance with the present invention is an improved polyester resin molding composition exhibiting improved gloss and resistance to warping comprising, in physical admixture, (a) a crystalline polyester or copolyester resin, alone, or in combination with (b) a second crystalline polyester resin, and (c) an effective amount of a reinforcing agent, the improvement comprising said composition containing at least one (d) modifier selected from an amorphous or semicrystalline thermoplastic selected from a poly(methyl methacrylate) or copolymer thereof, a copolyether-polyester, a polyetherimide ester, or a mixture of any of the foregoing, in an amount effective to improve the gloss and reduce the warp of articles molded from said polyester resin.

Contemplated, in accordance with this invention are the compositions above further defined wherein component (a) comprises poly(ethylene terephthalate) in an amount of from about 40 to about 80 parts by weight; component (c) comprises an amount of from about 10 to about 50 parts by weight; and component (d) comprises an amount of from about 1 to about 30 parts by weight, based on 100 parts by weight of (a), (c) and (d) combined.

Also contemplated by the invention herein are compositions as defined above wherein component (a) comprises poly(ethylene terephthalate) in an amount of from about 40 to about 80 parts by weight; component (b) comprises poly(1,4-butylene terephthalate) in an amount of from about 10 to about 40 parts by weight; component (c) comprises glass fibers and mica in admixture in an amount of from about 10 to about 50 parts by weight, and component (d) comprises an amorphous co-polyetherimide ester in an amount of from 1 to about 30 parts by weight, based on 100 parts by weight of (a), (b), (c) and (d) combined.

DETAILED DESCRIPTION OF THE INVENTION

The crystallizable polyester resins useful to prepare the compositions of this invention are available commercially, e.g., Vituf® 6200 (PET), Goodyear Company or they can be prepared by known techniques such as by the alcoholysis of esters of terephthalic acid with ethylene glycol or butanediol and subsequent polymerization, by heating the glycols with the free acids or with halide derivatives thereof and similar processes. These are described in U.S. Pat. Nos. 2,465,319 and 3,047,539 and elsewhere.

Preferably suitable as the crystallizable polyester resins of component (a) are poly(ethylene terephthalate) (PET) resins. Such polymeric linear terephthalic esters are composed of recurring structural units of the formula:

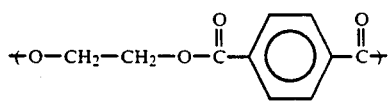

Such polymers can be made following the teachings of the aforementioned patents, U.S. Pat. Nos. 2,465,319 and 3,047,539.

Also suitable, optionally, as the crystalline polyester resins of component (b) are poly(1,4-butylene terephthalate) PBT resins in combination with the poly(ethylene terephthalate) resins above described. PBT resins are likewise well-known, are commercially available from a number of sources and have been widely employed for the production of thermoplastic molded articles.

Generally these high molecular weight polyesters will have an intrinsic viscosity of at least about 0.4 deciliters/gram and preferably, at least 0.7 deciliters/gram as measured in 60:40 phenol/tetrachloroethane mixture at 30° C.

The resinous polyester components can vary widely in amount. Preferably, when employed as the sole polyester, the poly(ethylene terephthalate) PET (a) may comprise from about 40 to about 80 parts by weight, based on 100 parts by weight of (a), (c) and (d). PET resin and PBT resin are also combinable with each other in all proportions in the range of from about 10 to about 40 parts by weight. Thus, from about 10 to about 40 parts by weight of PET can be combined with from about 10 to about 40 parts by weight of PBT, based on 100 parts of (a), (b), (c) and (d) combined.

The reinforcing agents may be selected from glass flakes, glass beads and fibers and polymeric fibers and combinations thereof as well as mineral reinforcing agents.

Although it is only necessary to use a reinforcing amount of the reinforcing agent, from 1–50 parts by weight of the total weight of the composition may comprise the reinforcing agent. A preferred range is from 5–50 parts by weight and an especially preferred range is 10–50 parts by weight.

The preferred reinforcing agents are of glass, and it is preferred to use fibrous glass filaments, mixtures of glass and talc, glass and mica, glass and aluminum silicate, for example.

The filamentous glass to be employed as reinforcement in the present compositions is well known to those skilled in the art and is widely available from a number of manufacturers. For compositions ultimately to be employed for electrical uses, it is preferred to use fibrous glass filaments comprised of lime-aluminum borosilicate glass that is relatively soda free. This is known as "E" glass. However, other glasses are useful where electrical properties are not so important, e.g., the low soda glass known as "C" glass. As will be exemplified in the next section, it is most preferred to use glass filaments known as G-filament. The filaments are made by standard processes, e.g., by steam or air blowing, flame blowing and mechanical pulling. The preferred filaments for plastics reinforcement are made by mechanical pulling. The filament diameters range from about 0.00012 to 0.00075 inch, but this is not critical to the present invention.

The length of the glass filaments and whether or not they are bundled into fibers and the fibers bundled in turn to yarns, ropes or rovings, or woven into mats, and the like, are also not critical to the invention. However, in preparing the molding compositions, it is convenient to use the filamentous glass in the form of chopped strands of from about 1 to about 2 inches longs. In articles molded from the instant compositions, on the other hand, even shorter lengths will be encountered because, during compounding, considerable fragmentation will occur. This is desirable, however, because the best properties are exhibited by thermoplastic injection molded articles in which the filament lengths lie between about 0.0005 and 0.125 (one-eighth) inch.

The compositions of this invention can include, in addition to the filamentous glass reinforcement of the type described, mineral fillers in combination therewith, such as, e.g., talc, clay, silica, calcium silicate, mica and the like. Preferred as a filler is talc and especially preferred is finely ground talc of up to 325 mesh particle size. These mineral fillers, if present, and used in combination with, for example, glass, will generally comprises from about 10 to about 90 parts by weight per 100 parts of reinforcing agent (c).

Component (d) comprise amorphous or semi-crystalline thermoplastics. With respect to component (d), it may comprise amorphous thermoplastics such as poly(methyl methacrylate) and/or poly(butyl acrylate)/methyl methacrylate copolymer. These materials are widely available commercially from a number of sources. Preferred is an impact-modified poly(methyl methacrylate), which by way of example is available from the Rohm and Haas Company under the trademark Plexiglas DR. These materials represent a family of rubberlike materials that can be processed and recycled as thermoplastics. Suitable materials for use in this invention are copolyesters, such as a copolyetherpolyester, polyether polyamides, poly(esteramides), and poly(etherimide esters). Preferred are copolyetherpolyesters such as GAFLEX of the GAF Company and poly(etherimide esters). The former is made by reacting dimethylterephthalate (DMT) with butanediol and with butenediol and polytetramethylene glycol, and is described in U.S. Pat. No. 4,355,155. The latter comprises the reaction product of (a) one or more diols;
(b) one or more dicarboxylic acids;
(c) one or more high molecular weight poly(oxyalkylene) diamines; and
(d) one or more tricarboxylic acids or derivatives thereof.

Further description of the preferred poly(etherimide esters) and methods for their preparation are given in McCready et al., U.S. Pat. No. 4,556,688.

The amount of amorphous or semi-crystalline thermoplastic, component (d) can vary widely in amount. The molding composition of the present invention will comprise from about 1 to about 35 parts by weight, preferably 1 to about 30 parts by weight, of component (d), based on the combined weights of components (a), (b), (c) and (d) or (a), (c) and (d).

Other ingredients, such as nucleating agents, flow promoters, antioxidants, stabilizers, dyes, pigments, plasticizers, flame retardants, drip retardants and the like can be added in conventional amounts for their conventionally employed purposes.

The warp resistant compositions of this invention can be prepared by a number of procedures known to those skill in this art. In one way given merely as illustration, the reinforcement, e.g., glass fibers, and, optionally, mineral filler, is put into an extrusion compounder with the resinous components, impact modifier, optionally with other additives, e.g., nucleating agents, flow promoters, antioxidants and stabilizer to produce molding pellets. The reinforcement is dispersed in a matrix of the resin and impact modifier in the process. In another procedure, the reinforcement (c) is mixed with the resins and impact modifier by dry blending, extruded and chopped. The reinforcing agent can also be mixed with the resins and impact modifier and directly molded, e.g., by injection or transfer molding techniques.

In addition, compounding should be carried out to ensure that the residence time in the machine is short; the temperature is controlled; the friction heat is utilized; and an intimate blend between the resin and the reinforcement is obtained.

Although it is not essential, best results are obtained if the ingredients are pre-compounded, pelletized and then molded. Pre-compounding can be carried out in conventional equipment. For example, after pre-drying the polyester(s), impact modifier, optional additives and the reinforcing agent, e.g., under vacuum at 100° C. for 12 hours, a single screw extruder is fed with a dry blend of the ingredients, the screw employed having a long transition section to ensure proper melting. On the other hand, a twin screw extrusion machine, e.g., a 28 mm Werner Pfleiderer machine can be fed with resin and additives at the feed port and reinforcement down stream. In either case, a generally suitable machine temperature will be about 450° to 570° F. It is preferred that the extruder be provided with a sideport to allow vacuum venting of gaseous by-products and moisture that is generated during the melting stage of the blends. The pre-compounded composition can be extruded and cut up into molding compounds such as conventional granules, pellets, etc., by standard techniques.

The composition can be molded in any equipment conventionally used for glass-filled thermoplastic compositions, e.g., a Van Dorn type injection molding machine with conventional cylinder temperature, e.g., 500°-550° F. and conventional mold temperatures, e.g., 150° F.-200° F.

DESCRIPTION OF THE PREFERRED EMBODIMENTS

The following examples illustrate the present invention. They are not to be construed to limit the claims in any manner whatsoever.

In Examples 1-9, the following ingredient is used: nucleating agent—sodium stearate

PROCEDURE A

A mixture of resinous PET, Vituf ® 6200, glass filaments, and impact modifier were mixed with a nucleating agent, sodium stearate, stabilizers and processing aid by tumbling 3-5 minutes in a 25 gallon stainless steel drum, and extruded on a HPM 2½" vented extruder (L/O=30) and molded into workpieces by injection molding on a Van Dorn 3.5, 75 Ton molding machine at 520° F., approximately 30 second cycle time.

EXAMPLES 1-3

Molded articles suitable for use in testing were prepared using Procedure A above. Compositions and test results are set forth in Table 1.

TABLE 1

Reinforced PET Molding Compositions Modified w/5% Impact Modifier

| | Example | | | |
|---|---|---|---|---|
| | 1A* | 1 | 2 | 3 |
| Composition (parts by weight) | | | | |
| PET[a] | 68.55 | 63.55 | 63.55 | 63.55 |
| Glass filament[b] | 30.0 | 30.0 | 30.0 | 30.0 |
| Nucleating agent | 0.6 | 0.6 | 0.6 | 0.6 |
| Stabilizers and processing aid | 0.85 | 0.85 | 0.85 | 0.85 |
| Modifier | | | | |
| Poly(methyl methacrylate)[c] | — | 5.0 | — | — |
| Poly(methyl methacrylate and butylacrylate)[d] | — | — | 5.0 | — |
| Copolyether polyester[e] | — | — | — | 5.0 |
| Properties | | | | |
| Heat deflection temp. °F., 264 psi | 448 | 456 | 456 | 448 |
| Notched Izod Impact ft.lb./in. | 1.42 | 1.38 | 1.39 | 1.58 |
| Unnotched Izod Impact ft.lb./in. | 11.4 | 8.4 | 9.2 | 11.6 |
| Flexural strength, psi | 34,500 | 31,800 | 32,700 | 30,400 |
| Flexural modulus psi × 10[6] | 1.23 | 1.24 | 1.26 | 1.13 |
| Tensile strength, psi | 22,800 | 22,700 | 22,300 | 21,500 |
| Melt viscosity, 510° F., poise | 9,500 | 9,300 | 8,200 | 7,300 |
| Warp,[1] as molded (mm) | 16 | 12.8 | 12.7 | 12.5 |
| Warp after 30 min. at 350° F. (mm) | 17.3 | 16.7 | 15.3 | 15.2 |
| Gardner Gloss[2] | 81 | 89 | 93 | 94 |

*Control
[a]Vituf ® 6200, Goodyear Company
[b]G-filaments, P387Fx1, Owens Corning Fiberglas Company
[c]Plexiglas ® V, Rohm & Haas Company
[d]Plexiglas ® DR, Rohm & Haas Company
[e]Gaflex ® 555, GAF Company
[1]Warp measured on 4" diameter × 1/16" thick disk, values reported represent height (in mm) of distortion from flat surface.
[2]Gardner Gloss measured with Gardner 85° Glossmeter IIA on 4" diameter × ⅛" thick disks along flow direction.

The above results indicate that articles with good warp resistance, improved flow, and surface gloss can be obtained in accordance with this invention.

EXAMPLE 4

Molded articles suitable for testing were prepared using Procedure A. Compositions and the results obtained are set forth in Table 2.

TABLE 2

Impact-Modified PET/PBT Compositions

| | Example | |
|---|---|---|
| | 4A* | 4 |
| Composition (parts by weight) | | |
| PBT[a] | 27.45 | 28.55 |
| PET[b] | 20.0 | 20.0 |
| Mica[c] | 20.0 | 20.0 |
| Glass[d] | 20.0 | 20.0 |
| Poly(methylmethacrylate-co-butyl acrylate) concentrate[e] | 10.0 | — |
| Co-poly(etherimide ester)[f] | — | 6.7 |
| Stabilizers and processing aid | 0.35 | 0.35 |
| Carbon black concentrate[g] | 2.2 | — |
| Carbon black concentrate[h] | — | 4.4 |
| Properties | | |
| Notched Izod ft.lbs/in. | 1.32 | 1.42 |
| Unnotched Izod ft.lbs/in. | 8.11 | 9.87 |
| Flexural Strength (psi) | 1,199 | 1,288 |
| Tensile Strength, (psi) | 12,360 | 14,370 |

TABLE 2-continued

| Impact-Modified PET/PBT Compositions | | |
|---|---|---|
| | Example | |
| | 4A* | 4 |
| Specific Gravity | 1.587 | 1.654 |
| Spiral Flow (inches) | 9.3 | 11.1 |
| Melt Viscosity, 510° F., (poises) | 21,550 | 14,170 |

*Comparative
<sup>a</sup>Valox ® 295, General Electric Company
<sup>b</sup>Reclaimed bottle scrap, RPP Company
<sup>c</sup>Suzorite ® 150S, Martin Marietta Company
<sup>d</sup>Chopped fiber 930, Certainteed Company
<sup>e</sup>A melt extruded blend of 80% Acryloid ® KM-330 (Rohm & Haas Co.) and 20% ethylene-ethylacrylate copolymer (DPD ® 6169, Union Carbide Co.)
<sup>f</sup>LOMOD ® J, General Electric Company
<sup>g</sup>50% carbonblack (Monarch ® 800, Cabot Co) in polyethylene
<sup>h</sup>25% carbonblack (Monarch ® 800, in LOMOD ® J copoly(etherimide ester)

The results above demonstrate that physically superior articles can be formed from impact-modified reinforced PBT/ PET molding compositions. Moreover, warp resistance and gloss should be dramatically improved.

EXAMPLES 5-9

Molded articles suitable for testing were prepared using Procedure A. Compositions and the results obtained are set forth in Table 3.

mold release agents, flame-retardants, and the like can all be added in conventional amounts without departing from the spirit of this invention. All such variations are within the full intended scope of the appended claims.

We claim:

1. In a method for providing an improved polyester resin molding composition exhibiting improved gloss and resistance to warping, said method consisting essentially of mixing
    (a) a crystalline polyester or copolyester resin, wherein said polyester resin consists essentially of poly(ethylene terephthalate), and
    (b) an effective amount of a reinforcing glass, the improvement consisting essentially of adding to the mixture of (a) and (b) an effective amount of
    (c) at least one modifier selected from an amorphous or a semi-crystalline thermoplastic poly(methyl methacrylate), in an amount effective to improve the gloss and reduce the warp of articles molded from said polyester resin.

2. In a method for providing an improved polyester resin molding composition exhibiting improved gloss and resistance to warping, said method consisting essentially of mixing
    (a) a crystalline polyester or copolyester resin, and
    (b) an effective amount of a reinforcing glass, the

TABLE 3

| Blends of PET With Impact Modified Acrylate and Polyetherimide Ester in 30% Glass Reinforced Compounds | | | | | | |
|---|---|---|---|---|---|---|
| | Example | | | | | |
| | 5A* | 5 | 6 | 7 | 8 | 9 |
| Composition (parts by weight) | | | | | | |
| PET<sup>a</sup> | 68.55 | 58.55 | 43.55 | 63.55 | 58.55 | 43.55 |
| Poly(methyl methacrylate and butyl acrylate)<sup>b</sup> | — | 10.00 | 25.00 | — | — | — |
| Co-poly(etherimide ester)<sup>c</sup> | — | — | — | 50.00 | 10.00 | 25.00 |
| Glass Fibers<sup>d</sup> | 30.00 | 30.00 | 30.00 | 30.00 | 30.00 | 30.00 |
| Sodium Stearate | 0.60 | 0.60 | 0.60 | 0.60 | 0.60 | 0.60 |
| Stabilizers and processing aid | 0.85 | 0.85 | 0.85 | 0.85 | 0.85 | 0.85 |
| Properties | | | | | | |
| Heat distortion, 264 psi, °F. | 430 | 442 | 370 | 439 | 438 | 351 |
| Notched Izod, ft.lbs./in. | 1.4 | 1.4 | 1.3 | 1.5 | 1.6 | 1.7 |
| Unnotched Izod, ft.lbs./in. | 14.5 | 15.8 | 8.4 | 16.0 | 14.0 | 13.4 |
| Tensile Strength, psi | 26,500 | 26,300 | 21,800 | 25,600 | 17,100 | 10,900 |
| Flexural Strength, psi | 35,00 | 31,500 | 27,300 | 31,700 | 21,600 | 12,000 |
| Flexural Modulus, psi × 10<sup>6</sup> | 1.14 | 1.16 | 1.10 | 1.11 | 1.13 | 0.71 |
| Specific Gravity | 1.59 | 1.58 | 1.52 | 1.59 | 1.59 | 1.53 |
| Warp, as molded, mm. | 14 | 10 | 6 | 14 | 13 | 4 |
| after 30 min. at 350° F. (mm) | 17 | 13 | 11 | 16 | 15 | 8 |
| Gardner Gloss | 80 | 80 | 86 | 87 | 92 | 92 |
| Spiral Flow, inches* | 10.4 | 10.2 | 10.8 | 11.2 | 13.2 | 19.0 |

*Measured at 520° F. barrel temperature, 30 sec. cycle time (20 sec. injection time). Value represents flow into 3/32" × ½" cross section spiral channel.
<sup>a</sup>VITUF ® 6200, Goodyear Chemical
<sup>b</sup>PLEXIGLAS ® V, Rohm and Haas Company
<sup>c</sup>LOMOD ® J, General Electric Company
<sup>d</sup>Chopped Fiber ® 930, Certainteed Company The results indicate that articles with good warp resistance, improved flow and improved gloss characteristics can be obtained in accordance with this invention.

The above-mentioned patents and test methods are incorporated herein by reference.

The foregoing detailed description will suggest many variations to those skilled in this art. For example, instead of using poly(ethylene terephthalate) or poly(1,-4butylene terephthalate) as the poly(alkylene arylate), other compounds such as poly(ethylene isophthalate) can be used. Instead of glass or glass with mica filler, other reinforcers alone or combined with mineral fillers can be used, such as glass and talc. Other conventional additives such as pigments, dyes, colorants, plasticizers, improvement consisting essentially of adding to the mixture of (a) and (b) an effective amount of
    (c) at least one modifier selected from an amorphous or a semi-crystalline thermoplastic poly(methyl methacrylate), in an amount effective to improve the gloss and reduce the warp of articles molded from said polyester resin, wherein component (a) is poly(ethylene terephthalate) in an amount of from about 40 to about 80 parts by weight; component (b) is from about 10 to about 50 parts by weight; and component (c) is from about 1 to about 30 parts by weight, based on 100 parts by weight of (a), (b) and (c), combined.

* * * * *